United States Patent [19]

Van Heusden et al.

[11] Patent Number: 5,025,433
[45] Date of Patent: Jun. 18, 1991

[54] ELECTRO-OPTICAL DEVICE

[75] Inventors: Omar P. L. P. Van Heusden; Jozef H. M. R. Verheyen, both of Hasselt, Belgium

[73] Assignee: U. S. Philips Corporation, New York, N.Y.

[21] Appl. No.: 303,601

[22] Filed: Jan. 27, 1989

[30] Foreign Application Priority Data

Feb. 16, 1988 [NL] Netherlands ............................ 8800373

[51] Int. Cl.⁵ .............................................. G11B 7/00
[52] U.S. Cl. ............................... 369/44.14; 369/44.32
[58] Field of Search ................ 369/44.32, 44.14, 44.21, 369/43, 215, 219

[56] References Cited

U.S. PATENT DOCUMENTS 4,637,004 1/1987 Araki et al. ....................... 369/44.32
4,694,442 9/1987 Gijzen et al. ...................... 369/44.32

Primary Examiner—Donald McElheny, Jr.
Attorney, Agent, or Firm—David R. Treacy

[57] ABSTRACT

Device for reading an optical disc (5) includes a turntable (17) which is rotatable about an axis of rotation (19), and a slide (11) supported directly in the frame and which carries an objective (9) having an optical axis (9a). A slide-supporting arrangement is constructed in such a way that it allows both the displacement of the slide in a radial direction and a pivotal movement of the slide about a pivotal axis (13) which is stationary relative to the frame. A slide-drive arrangement (31, 33) radially moves the objective, and a drive unit (25, 27) with a control element (29) tilts the slide.

10 Claims, 2 Drawing Sheets

ELECTRO-OPTICAL DEVICE

BACKGROUND OF THE INVENTION

The invention relates to an electro-optical device for recording and/or reading information in an information plane in an optical record carrier by means of a radiation beam. The device includes a frame carrying a turntable rotatable about an axis of rotation and an optical unit having an objective arranged on a slide pivotable about a pivotal axis which is stationary relative to the frame, to focus the radiation beam so as to form a radiation spot in the information plane. The pivotal axis extends at least substantially transversely of the plane defined by the optical axis and the axis of rotation. The device further includes a slide supporting arrangement and a slide-drive arrangement for moving the objective radially of the turntable between a first position situated near the turntable and a second position which is more remote thereof, and means for tilting the slide.

Such an electro-optical device is known from U.S. Pat. No. 4,637,004 (herewith incorporated by reference) and can be used in optical disc record players.

In electro-optical devices of the type defined above the radiation beam emitted by a laser is concentrated by the objective to form a tiny radiation spot. The radiation spot comprises a bright central portion surrounded by concentric rings of lower intensity. When the center of the radiation spot is situated at an information track the radiation will also be partly incident on adjacent tracks. The radiation which is reflected therefore not only contains the information of the track being scanned but also information pertaining to the adjacent tracks. The reflected radiation is received by radiation sensitive electronic means of the device in order to produce electrical signals corresponding to the information in the reflected radiation. The resulting crosstalk between adjacent information tracks largely depends on the radiation distribution within the radiation spot in the information plane, which radiation distribution may be influenced considerably by an oblique position of the information surface of the disc distribution. An oblique position of the information surface results in an increased radiation intensity towards one side of the central portion, namely in the direction in which the disc surface is inclined, so that during reading, in particular of a disc which is disposed obliquely in a radial direction, the crosstalk between the information track scanned by the radiation spot and the adjacent tracks increases.

An oblique position of an optical disc in a radial direction is mainly caused by out-of-flatness of the disc surface under its own weight. Furthermore, material stresses in the multi-layer optical discs may give these discs a paraboloid shape, also resulting in an oblique position in a radial direction.

The electro-optical device disclosed in U.S. Pat. No. 4,637,004 has correction means which during recording and/or reading of the information tracks provide a correction for the neutral position of the optical axis by tilting the objective about a pivotal axis perpendicular to the optical axis through a correction angle which is related to the direction of the normal to the information surface of the optical disc at the location of the intersection between the surface and the optical axis of the objective. For this purpose the known electro-optical device has a frame, a subframe, and a slide which carries the optical scanning unit and which is translatable relative to the subframe. The slide serves for translating the scanning unit relative to the turntable along a radial path. For this purpose parallel guide means for the slide are provided, which guide means comprise a sliding rod secured to the subframe. A motor unit secured to the subframe drives the slide via a pinion and a gear rack. To correct for an oblique position of the disc surface the subframe is pivotally mounted on the frame. For this purpose a shaft arranged in the center of the subframe enables the subframe to be tilted relative to the frame about a pivotal axis which coincides with the shaft. The pivotal axis extends transversely of the plane defined by the optical axis of the optical scanning unit and the axis of rotation of the turntable. For tilting the subframe about the axis a further motor unit is provided. Thus, in the known construction the position of the scanning unit is adapted to the oblique position of the optical disc by tilting the assembly comprising the subframe, the parallel guide means for the slide, and the slide itself relative to the frame.

An electro-optical device which is closely related to the prior-art device described in the foregoing is disclosed in European Patent Application 0,196,691 to which U.S. Pat. No. 4,694,442 corresponds; (herewith incorporated by reference). However, in this known device the motor unit for the slide is secured to the movable sub-frame and is coupled to the slide via a rather intricate transmission mechanism.

A disadvantage of the known electro-optical devices is the intricate tilting constructions necessary to correct the position of the optical scanning element relative to the surface of the optical disc during scanning of the disc. As will be evident from the foregoing, these tilting constructions comprise a subframe which is pivotally movable in the frame and a slide which is linearly movable in the subframe and which carries the optical scanning element. An additional disadvantage of the device disclosed in U.S. Pat. No. 4,637,004 resides in the location where the motor unit for the slide is secured to the subframe. When the motor unit is secured at this location this increases the likelihood of undesired mechanical vibrations being set up in the device, while in addition it necessitates the use of flexible electrical wiring to the motor unit.

SUMMARY OF THE INVENTION

It is an object of the invention to provide an electro-optical device of the type defined in the opening paragraph, which during recording and/or reading of the information tracks provides a correction for an oblique position of an optical disc by a simple yet very accurate construction comprising a small number of parts.

The slide is supported directly in the frame, and the slide-supporting arrangement enables the slide to be moved in a radial direction and to be tilted about the pivotal axis. The means for tilting the slide may be provided with an electrical drive unit which is electronically coupled to an angular-position detector on the optical unit for detecting an oblique position of the disc, so that there is a direct relationship between the angle through which the slide is to be tilted and the angle between the optical axis of the optical element and the normal to the surface of the disc at the location where the optical axis and the surface intersect.

An advantage of the electro-optical device in accordance with the invention is that a simple yet economical construction enables the position of the objective to be adapted to the oblique position of the disc and the direction of the optical axis to be correlated with the normal to the disc at the location of the recording track to be recorded or read over the entire recording area of the optical disc. As a result of the simple construction the mechanical adjustments needed during production are easy to realize. Moreover, the device is very suitable for mounting the slide-drive arrangement on the frame, so that it is easy to preclude undesired vibrations during driving of the slide.

It is to be noted that from U.S. Pat. No. 4,637,004 an electro-optical device is known, which comprises a tilting element for an objective, the tilting element being pivotally supported in a slide which is movable along a guide rail. In this known device the pivotal axis of the tilting element and the optical axis of the objective are always situated in the same plane. Pivoting the tilting element relative to the slide may provide a certain degree of correction for an oblique position of an optical disc is possible, in such a way that the angle between the optical axis and the normal to the disc surface at the location where the optical axis and the surface intersect is reduced, but an adaptation of the distance between the objective and this intersection with the surface, which varies as a result of the oblique position of the disc, cannot be achieved by pivoting the tilting element. Therefore, this known device, in which the pivotal axis is moved relative to the frame of the device simultaneously with the slide has the disadvantage that the objective must be capable of performing a substantial travel along the optical axis. For completeness sake it is to be noted that a similar device is known from Japanese Kokai 61-20 6929. This known device also includes a linearly movable slide having a slide section which carries the objective and which is pivotable about a spindle which moves along with the slide.

The means for tilting the slide may include a control element which is connected to the slide and which cooperates with the drive unit. This enables the slide to be tilted about a stationary axis of the frame constituted by the pivotal axis at any location within its linear path by means of a simple construction. In this respect a very compact device can be obtained when the control element is slidably coupled to the slide. The control element may then be constructed as a rod.

The slide supporting arrangement may include at least one rotational supporting member and a linear supporting member. Suitably, the rotational supporting member has a curved supporting surface and the linear supporting member has a straight supporting surface.

In a practical embodiment the curved supporting surface forms part of a shaft end portion and the straight supporting surface is constituted by a supporting groove which extends in a substantially radial direction. The slide can then be driven by providing the slide drive arrangement with a pinion which is constructed to cooperate with one or two suitable gear racks.

DETAILED DESCRIPTION OF THE PREFERRED EMBODIMENTS

Figure 1:
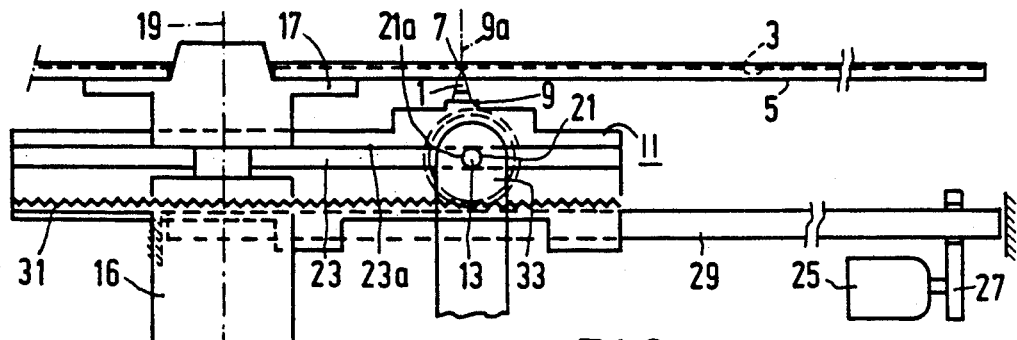
FIG. 1 illustrates diagrammatically the principle of the invention.

A practical embodiment of the electro-optical device in accordance with the invention, shown diagrammatically in FIG. 1, is suitable for scanning recording tracks in a reflecting information surface 3 of an optical disc 5 by means of a radiation beam 1 produced by a laser, for example an AlGaAs laser. The optical disc 5 may be, for example, a Compact Disc, a Compact Disc with a video clip, or a video disc. It will be known that the information surface 3 is provided with a reflecting layer and on its underside the information surface is covered with a transparent coating. The radiation beam 1 is focused through the transparent coating to form a radiation spot 7. For this purpose there is provided an objective 9 having an optical axis 9a and comprising at least one convergent lens, which is movable over a limited distance along the optical axis 9a by an actuator.

The objective 9 forms part of an optical unit, which is arranged on a slide 11. The slide 11 is pivotable about a stationary spindle 13 of the frame 15. The optical disc 3 is supported on a turntable 17 which can e driven by an electric motor 16 and which is supported in the frame 15 via the electric motor 16, to rotate this disc about an axis of rotation 19. The optical axis 9a and the axis of rotation 19 are situated in one radial plane, the pivotal axis 13 intersects this radial plane perpendicularly. The pivotable slide 11 is radially movable relative to the axis of rotation 19 in order to move the objective 9 between a first position situated near the turntable and corresponding to the first information track of the optical disc and a second position corresponding to the last information track of the optical disc. In order to enable the slide 11 to be moved in a radial direction and to be tilted about this pivotal axis 13, the device in accordance with the invention is provided with a slide-supporting arrangement allowing both movements. FIG. 1 diagrammatically shows such a slide-supporting arrangement in the form of a round shaft 21 which is journalled in the frame 15 and which has an end portion engaging a supporting groove 23 in the slide, the shaft 21 having a curved or arcuate supporting surface 21a and the groove 23 having a straight supporting surface 23a. The supporting surfaces 21a and 23a cooperate with each other both rotationally and translationally, so that the slide is pivotable about the stationary shaft 13 in any arbitrary position intermediate the first and the second position.

By means of a detector, not shown, arranged on the slide the first and the second position of the slide 11 can be adjusted accurately. An angular-position detector, not shown and arranged on the slide, can be used for controlling an electric motor 25 to provide a correction for an oblique position of the information surface of the disc 5. Such an angular-position detector is known per se and can supply an angular-error signal which depends on the angle between the optical axis 9a of the objective 9 and the normal to the surface 3 of the optical disc 5 at the location where this surface is intersected by the optical axis. It is possible to employ, for example, an angular-position detector and control means to which the angular-error signal can be applied for controlling an electric motor, as described in Netherlands Patent Application 8,004,969.

Electric motor 25 is coupled to an eccentric mechanism 27, which cooperates with a rod-shaped control element 29, which is slidably supported in the slide 11.

For the radial displacement of the slide 11, this slide is provided with a gear rack 31 which extends in a radial direction, and a slide-drive arrangement is provided, which arrangement comprises a gear wheel 33 cooperating with the gear rack 31.

For completeness' sake it is to be noted that it is advisable to select the distance between the pivotal axis and the axis of rotation of the turntable in such a way that it at least substantially corresponds to one third of the distance between the axis of rotation and the optical axis, measured in the second position of the objective.

Figure 2:
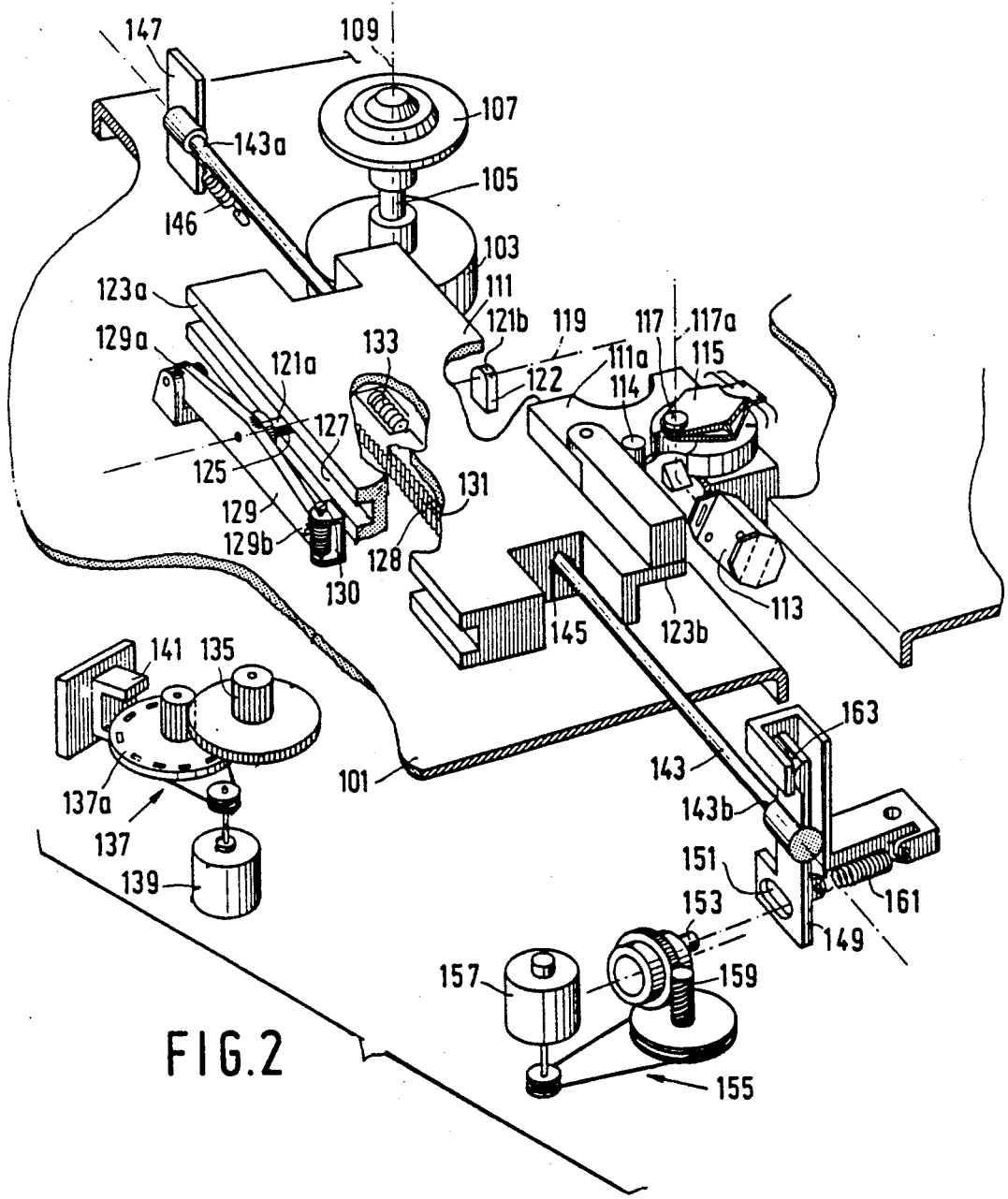
FIG. 2 shows a part of an embodiment partly in cutaway perspective view and partly in exploded view.

The embodiment shown in FIG. 2 comprises a frame 101 to which an electric motor 103 having a motor shaft 105 is secured. The motor shaft 105 carries a turntable 107 for an optical disc. The electric motor 103 serves for rotating the turntable 107 about an axis of rotation 109 and also supports the turntable 107. The electro-optical device further comprises a slide 111 which is pivotable and translatable relative to the frame 101 and which comprises a structural member 111a to which an optical unit 113 is adjustably secured. The optical unit 113 comprises inter alia a laser, a collimator lens, a read diode, and an angular position detector 114, and it further comprises a focus actuator 115 with an objective 117. The focus actuator may be of the type as described in Netherlands Patent Application 8602564. The objective 107 has an optical axis 117a which together with the axis of rotation 109 defines a radial plane.

The pivotable slide 111 is directly supported in the frame 101 by a slide-supporting arrangement. The slide-supporting arrangement is constructed in such a way that the slide can move in a radial direction and can perform a pivotal movement about a pivotal axis 119 which is stationary relative to the frame 101.

For this purpose the slide-supporting arrangement comprises a first and a second curved supporting surface 121a and 121b respectively and two straight supporting surfaces 123a and 123b. The curved supporting surface 121a is formed by a shaft-end portion 125 which is adjustably secured to the frame 101 and which engages a supporting groove 127 formed in a longitudinal side of the slide 111, the straight supporting surface 123 being situated in this groove. The curved supporting surface 121b is constituted by a rounded projection 122 of the frame 101 which slidably supports the supporting surface 123b, which may be positioned at the underside of the slide 111. The shaft-end portion 125, which is adjustably secured to the frame 101, forms part of a lever 129, which at one end 129a is pivotally connected to the frame 901 and at another end 129b is connected to the frame 101 by means of an adjustment mechanism 130. The lever 129 enables the slide 111 to be tilted about the longitudinal axis indicated in FIG. 2, in order to adjust the correct orientation of the optical axis 117a of the objective 117 during manufacture of the device.

The slide 111 is provided with a gear rack construction comprising a stationary gear rack 128 and a gear rack 131 which is movable relative thereto and which is coupled to a compression spring 133 secured to the slide 111. The gear rack construction cooperates with a pinion 135, which is driven by an electric motor 139 via a transmission mechanism 137. The electric motor 139, the transmission mechanism 137, the pinion 135 and the gear rack construction together form a slide-drive arrangement for moving the objective 117 in a radial direction relative to the turntable 107 between a first position situated near the turntable and a second position which is more remote from this turntable. The transmission mechanism 137 inter alia comprises a wheel 937a having a plurality of apertures situated on a circle and adapted to cooperate with an optical sensor 141 to detect the correct radial position of the slide.

The electro-optical device shown in FIG. 2 further comprises a control element in the form of a rod 143 which slidably engages a bore 145 in the slide and which primarily serves to pivot the slide 111 in any radial position in a controllable and well-defined manner. An end portion 143a of the rod 143 is provided with a sleeve 144 and is urged against a sliding surface 147 of the frame 101 by a spring 146 secured of the frame 101. Another end 143b of the rod 143 is provided with a coupling member 149 formed with a slot 151 which is adapted to cooperate with an eccentric mechanism 153 of a drive unit 155. The drive unit 155 further comprises an electric motor 157 and a transmission mechanism 159. A sliding portion 149a of the coupling member 149 is urged against a stationary sliding surface 163 by a tension spring 161 secured to the frame 101. The tension springs 146 and 161 ensure that the rod 143 is supported in the slide 111 without clearance. In the embodiment described in the foregoing no stringent requirements have to be imposed on the smoothness and straightness of the frame in view of the adjustment possibilities.

Figure 3:
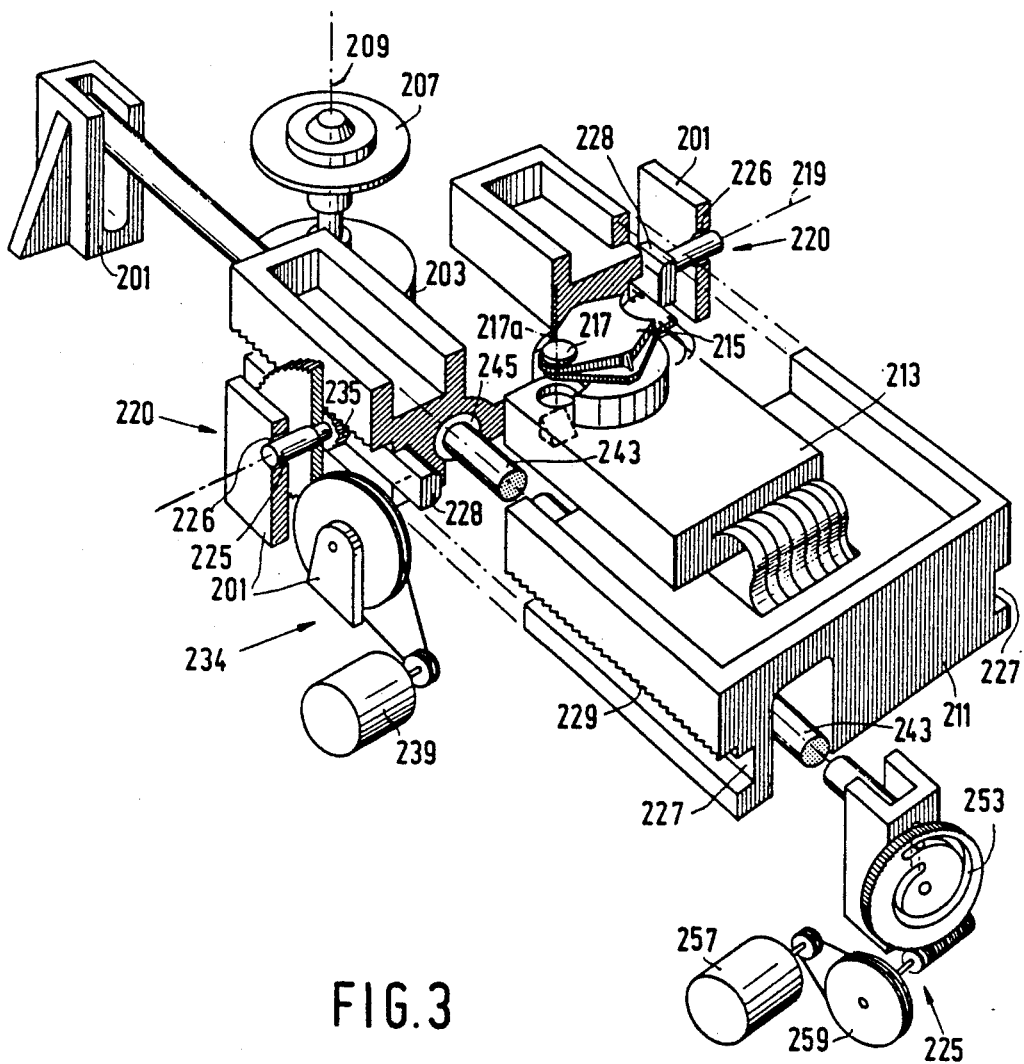
FIG. 3 is partly cut-away perspective view of a part of a second embodiment.

The embodiment of the electro-optical device shown in FIG. 3 is a variant of the device shown in FIG. 2 and comprises a frame 201, a U-shaped slide 211, which is pivotable about an axis 219 stationary relative to the frame 201, an optical unit 213 secured to the pivotable slide 211 and comprising an objective 217, and a turntable 207 for supporting an optical disc and driven by an electric motor 203 supported in the frame 201. The objective 217 is movable over a limited distance along its optical axis 217a for the purpose of focussing a radiation beam produced by the optical unit in order to form a radiation spot in the information plane of an optical disc arranged on the turntable 207, and for this purpose the objective is driven by a focus actuator 215. In order to enable the information tracks of the optical disc to be scanned to be followed by means of the objective 217 the objective 217 must be movable along a radial path. This radial movement is obtained by means of a slide-supporting arrangement which permits both said pivotal movement about the pivotal axis 219 and a radial movement of the slide 211.

For this purpose the slide-supporting arrangement comprises two supporting means 220 each comprising a rotational supporting member and a linear supporting member. The rotational supporting member of each of the supporting means 220 is constituted by a cylindrical shaft 225 which is rotatable in a male bore 226 in the frame 201. The linear supporting member of each of the supporting means 220 is constituted by a sliding block 228 which is secured to the shaft 225 and which is slidable in a groove 227 formed in a longitudinal side wall of the slide 211.

For moving the slide 211 carrying the objective 217 in a radial direction relative to the turntable 207, which is rotatable about an axis of rotation 209, a slide-drive arrangement 234 is provided. The slide-drive arrangement 234 comprises an electric motor 239, a transmission mechanism comprising a pinion 235 and a gear rack 229. The slide 211 comprises two limbs 211a and 211b which are disposed at opposite sides of the electric motor 203 and the turntable 207 and which are spaced at such a distance from one another that by radially moving the slide 211 the objective 217 can be moved up to a short distance from the turntable 207 to enable information tracks of the optical disc situated close to the axis of rotation 209 to be scanned.

In order to compensate for an oblique position of an optical disc supported on the turntable 7 the electro optical device comprises a drive unit 225 and a control element 243 which can be driven by this drive unit. The drive unit 225 comprises an electric motor 257 secured to the frame, a transmission mechanism 259, and an eccentric mechanism 253, and it enables the control element 243 to be tilted about the stationary axis 219 through a small tilting angle. The control element 243 is at least partly cylindrical and is slidably supported in the slide 211 by a cylindrical bearing sleeve 245. As a result of this supporting arrangement and the selected slide-supporting arrangement 220 the slide 211 is pivotable about the stationary pivotal axis 219 in any radial position.

For completeness' sake it is to be noted that the invention is not limited to the embodiments shown in the drawings. For example, it is possible to arrange a lever construction as used in the embodiment shown in FIG. 2 on both sides of the slide. Moreover, within the scope of the invention it is possible to use other slide-supporting arrangements than shown.

What is claimed is:

1. An electro-optical device for recording and/or reading information in an information plane in an optical record carrier by means of a radiation beam, comprising
   a frame carrying a turntable which is rotatable about an axis of rotation,
   an optical unit which comprises an objective having an optical axis and which is arranged on a slide which is pivotable about a pivotal axis which is stationary relative to the frame to focus the radiation beam so as to form a radiation spot in the information plane, the pivotal axis extending at least substantially transversely of the plane defined by the optical axis and the axis of rotation,
   a slide supporting arrangement and a slide-drive arrangement for moving the objective radially of the turntable between a first position situated near the turntable and a second position which is more remote thereof, and
   means for tilting the slide, characterized in that the slide is supported directly in the frame, the slide-supporting arrangement enabling the slide to be moved in a radial direction and to be tilted about said pivotal axis.

2. An electro-optical device as claimed in claim 1, said means comprising a drive unit, characterized in that the means comprise a control element which is connected to the slide and which cooperates with said drive unit.

3. An electro-optical device as claimed in claim 2, characterized in that the control element is slidably coupled to the slide.

4. An electro-optical device as claimed in claim 2, characterized in that the slide comprises at least one sliding surface against which the control element is urged under spring force.

5. An electro-optical device as claimed in claim 1, characterized in that the slide supporting arrangement comprises at least one rotational supporting member and one linear supporting member.

6. An electro-optical device as claimed in claim 5, characterized in that the rotational supporting member has a curved supporting surface and the linear supporting member has a straight supporting surface.

7. An electro-optical device as claimed in claim 6, characterized in that the curved supporting surface forms part of a shaft end portion which extends transversely of the plane defined by the optical axis and the axis of rotation, and in that the straight supporting surface is formed by a substantially radial supporting groove.

8. An electro-optical device as claimed in claim 1, characterized in that the slide-drive arrangement comprises a pinion which cooperates with at least one gear rack which extends in a substantially radial direction.

9. An electro-optical device as claimed in claim 1, characterized in that the slide-drive arrangement is secured to the frame.

10. An electro-optical device as claimed in claim 3, characterized in that the control element takes the form of a rod.

* * * * *